(12) United States Patent
Rhodes et al.

(10) Patent No.: US 7,765,792 B2
(45) Date of Patent: Aug. 3, 2010

(54) SYSTEM FOR PARTICULATE MATTER SENSOR SIGNAL PROCESSING

(75) Inventors: Michael L. Rhodes, Richfield, MN (US); Brian C. Krafthefer, Stillwater, MN (US); David B. Kittleson, Minneapolis, MN (US); Hongbin Ma, Falcon Heights, MN (US)

(73) Assignee: Honeywell International Inc., Morristown, NJ (US)

( * ) Notice: Subject to any disclaimer, the term of this patent is extended or adjusted under 35 U.S.C. 154(b) by 807 days.

(21) Appl. No.: 11/163,546

(22) Filed: Oct. 21, 2005

(65) Prior Publication Data
US 2007/0089399 A1 Apr. 26, 2007

(51) Int. Cl.
*F02M 25/06* (2006.01)
(52) U.S. Cl. .............. 60/278; 60/276; 60/277; 60/297; 73/23.33; 73/28.02
(58) Field of Classification Search ............ 60/276, 60/277, 297, 311, 274, 278, 300; 73/23.33, 73/28.01, 28.02
See application file for complete search history.

(56) References Cited

U.S. PATENT DOCUMENTS

| | | | |
|---|---|---|---|
| 3,744,461 A | 7/1973 | Davis | |
| 4,005,578 A | 2/1977 | McInerney | |
| 4,055,158 A | 10/1977 | Marsee | |
| 4,252,098 A | 2/1981 | Tomczak et al. | |
| 4,383,441 A | 5/1983 | Willis et al. | |
| 4,426,982 A | 1/1984 | Lehner et al. | |
| 4,438,497 A | 3/1984 | Willis et al. | |
| 4,456,883 A | 6/1984 | Bullis et al. | |
| 4,485,794 A | 12/1984 | Kimberley et al. | |
| 4,601,270 A | 7/1986 | Kimberley et al. | |
| 4,653,449 A | 3/1987 | Kamei et al. | |
| 4,656,832 A * | 4/1987 | Yukihisa et al. | ............... 60/303 |
| 5,044,337 A | 9/1991 | Williams | |
| 5,076,237 A * | 12/1991 | Hartman et al. | ............. 123/672 |
| 5,089,236 A | 2/1992 | Clerc | |

(Continued)

FOREIGN PATENT DOCUMENTS

DE 10145649 3/2003

(Continued)

OTHER PUBLICATIONS

"SCR, 400-csi Coated Catalyst," Leading NOx Control Technologies Status Summary, 1 page prior to the fiing date of the present application.

(Continued)

*Primary Examiner*—Tu M Nguyen
(74) *Attorney, Agent, or Firm*—Crompton Seager & Tufte LLC

(57) ABSTRACT

A system having a particulate matter sensor in an exhaust stream of an engine upstream from a particulate filter and another such sensor downstream from the filter. There may also be an exhaust gas recirculation (EGR) control on the engine. The amount of particulate matter in or loading of the filter may be determined by the upstream filter. The working condition of the filter may be determined by the downstream sensor. The filter may have a heater and control for providing operational and particulate matter burn-off temperatures to the filter. A processor may be connected to the sensors, the EGR control and the filter heater control.

3 Claims, 17 Drawing Sheets

U.S. PATENT DOCUMENTS

| | | |
|---|---|---|
| 5,108,716 A | 4/1992 | Nishizawa |
| 5,123,397 A | 6/1992 | Richeson |
| 5,233,829 A | 8/1993 | Komatsu |
| 5,282,449 A | 2/1994 | Takahashi et al. |
| 5,349,816 A | 9/1994 | Sanbayashi et al. |
| 5,365,734 A | 11/1994 | Takeshima |
| 5,398,502 A | 3/1995 | Watanabe |
| 5,423,180 A | 6/1995 | Nobue et al. |
| 5,452,576 A | 9/1995 | Hamburg et al. |
| 5,477,840 A | 12/1995 | Neumann |
| 5,560,208 A | 10/1996 | Halimi et al. |
| 5,570,574 A | 11/1996 | Yamashita et al. |
| 5,609,139 A | 3/1997 | Ueda et al. |
| 5,611,198 A | 3/1997 | Lane et al. |
| 5,651,248 A * | 7/1997 | Kawamura .................. 60/286 |
| 5,690,086 A | 11/1997 | Kawano et al. |
| 5,692,478 A | 12/1997 | Nogi et al. |
| 5,746,183 A | 5/1998 | Parke et al. |
| 5,765,533 A | 6/1998 | Nakajima |
| 5,771,867 A | 6/1998 | Amstutz et al. |
| 5,785,030 A | 7/1998 | Paas |
| 5,788,004 A | 8/1998 | Friedmann et al. |
| 5,846,157 A | 12/1998 | Reinke et al. |
| 5,893,092 A | 4/1999 | Driscoll |
| 5,942,195 A | 8/1999 | Lecea et al. |
| 5,964,199 A | 10/1999 | Atago et al. |
| 5,974,788 A | 11/1999 | Hepburn et al. |
| 6,029,626 A | 2/2000 | Bruestle |
| 6,035,640 A | 3/2000 | Kolmanovsky et al. |
| 6,048,620 A | 4/2000 | Zhong |
| 6,055,810 A | 5/2000 | Borland et al. |
| 6,055,965 A | 5/2000 | Amstutz et al. |
| 6,058,700 A | 5/2000 | Yamashita et al. |
| 6,067,800 A | 5/2000 | Kolmanovsky et al. |
| 6,076,353 A | 6/2000 | Freudenberg et al. |
| 6,105,365 A | 8/2000 | Deeba et al. |
| 6,148,656 A | 11/2000 | Breton |
| 6,153,159 A | 11/2000 | Engeler et al. |
| 6,161,528 A | 12/2000 | Akao et al. |
| 6,170,259 B1 | 1/2001 | Boegner et al. |
| 6,171,556 B1 | 1/2001 | Burk et al. |
| 6,178,743 B1 | 1/2001 | Hirota et al. |
| 6,178,749 B1 | 1/2001 | Kolmanovsky et al. |
| 6,205,842 B1 | 3/2001 | Patashnick et al. |
| 6,216,083 B1 | 4/2001 | Ulyanov et al. |
| 6,237,330 B1 | 5/2001 | Takahashi et al. |
| 6,242,873 B1 | 6/2001 | Drozdz et al. |
| 6,263,672 B1 | 7/2001 | Roby et al. |
| 6,273,060 B1 | 8/2001 | Cullen |
| 6,279,551 B1 | 8/2001 | Iwano et al. |
| 6,312,538 B1 | 11/2001 | Latypov et al. |
| 6,321,538 B2 | 11/2001 | Hasler |
| 6,338,245 B1 | 1/2002 | Shimoda et al. |
| 6,347,619 B1 | 2/2002 | Whiting et al. |
| 6,360,159 B1 | 3/2002 | Miller et al. |
| 6,360,541 B2 | 3/2002 | Waszkiewicz et al. |
| 6,360,732 B1 | 3/2002 | Bailey et al. |
| 6,379,281 B1 | 4/2002 | Collins et al. |
| 6,425,371 B2 | 7/2002 | Majima |
| 6,427,436 B1 | 8/2002 | Allansson et al. |
| 6,431,160 B1 | 8/2002 | Sugiyama et al. |
| 6,432,168 B2 * | 8/2002 | Schonauer .................... 95/18 |
| 6,435,019 B1 * | 8/2002 | Vojtisek-Lom ............. 73/118.1 |
| 6,463,733 B1 | 10/2002 | Asik et al. |
| 6,463,734 B1 | 10/2002 | Tamura et al. |
| 6,466,022 B1 | 10/2002 | Koopmans |
| 6,470,682 B2 | 10/2002 | Gray, Jr. |
| 6,470,866 B2 | 10/2002 | Cook |
| 6,502,391 B1 | 1/2003 | Hirota et al. |
| 6,512,974 B2 | 1/2003 | Houston et al. |
| 6,546,329 B2 | 4/2003 | Bellinger |
| 6,560,528 B1 | 5/2003 | Gitlin et al. |
| 6,571,191 B1 | 5/2003 | York et al. |
| 6,579,206 B2 | 6/2003 | Liu et al. |
| 6,612,293 B2 | 9/2003 | Schweinzer et al. |
| 6,625,978 B1 | 9/2003 | Eriksson et al. |
| 6,629,408 B1 | 10/2003 | Murakami et al. |
| 6,647,710 B2 | 11/2003 | Nishiyama et al. |
| 6,647,971 B2 | 11/2003 | Vaughan et al. |
| 6,671,603 B2 | 12/2003 | Cari et al. |
| 6,672,060 B1 | 1/2004 | Buckland et al. |
| 6,679,050 B1 | 1/2004 | Takahashi et al. |
| 6,687,597 B2 | 2/2004 | Sulatisky et al. |
| 6,705,084 B2 | 3/2004 | Allen et al. |
| 6,742,330 B2 | 6/2004 | Genderen |
| 6,758,037 B2 * | 7/2004 | Terada et al. .................. 60/295 |
| 6,789,533 B1 | 9/2004 | Hashimoto et al. |
| 6,823,667 B2 | 11/2004 | Braun et al. |
| 6,823,675 B2 | 11/2004 | Brunell et al. |
| 6,826,903 B2 | 12/2004 | Yahata et al. |
| 6,827,061 B2 | 12/2004 | Nytomt et al. |
| 6,971,258 B2 * | 12/2005 | Rhodes et al. ............. 73/28.01 |
| 7,081,154 B2 * | 7/2006 | Schulte et al. ................ 95/273 |
| 7,278,304 B2 * | 10/2007 | Zanini-Fisher et al. .... 73/119 R |
| 7,334,401 B2 * | 2/2008 | Cheng ......................... 60/297 |
| 7,549,317 B2 * | 6/2009 | Rhodes et al. ............. 73/23.31 |
| 2001/0002591 A1 | 6/2001 | Majima |
| 2002/0029564 A1 | 3/2002 | Roth et al. |
| 2002/0056434 A1 | 5/2002 | Flamig-Vetter et al. |
| 2002/0098975 A1 | 7/2002 | Kimura et al. |
| 2002/0170550 A1 | 11/2002 | Mitsutani |
| 2002/0173919 A1 | 11/2002 | Moteki et al. |
| 2002/0184879 A1 | 12/2002 | Lewis |
| 2002/0194835 A1 | 12/2002 | Bromberg et al. |
| 2003/0022752 A1 | 1/2003 | Liu et al. |
| 2003/0041590 A1 | 3/2003 | Kitajima et al. |
| 2003/0089101 A1 | 5/2003 | Tanaka et al. |
| 2003/0101713 A1 | 6/2003 | Dalla Betta et al. |
| 2003/0120410 A1 | 6/2003 | Cari et al. |
| 2003/0143957 A1 | 7/2003 | Lyon |
| 2003/0145837 A1 | 8/2003 | Esteghlal et al. |
| 2003/0150422 A1 | 8/2003 | Huh |
| 2003/0172907 A1 | 9/2003 | Nytomt et al. |
| 2003/0200016 A1 | 10/2003 | Spillane et al. |
| 2003/0221679 A1 | 12/2003 | Surnilla |
| 2003/0225507 A1 | 12/2003 | Tamura |
| 2004/0006973 A1 | 1/2004 | Makki et al. |
| 2004/0007211 A1 | 1/2004 | Kobayashi |
| 2004/0007217 A1 | 1/2004 | Poola et al. |
| 2004/0025837 A1 | 2/2004 | Hunt et al. |
| 2004/0034460 A1 | 2/2004 | Folkerts et al. |
| 2004/0040283 A1 | 3/2004 | Yasui et al. |
| 2004/0040287 A1 | 3/2004 | Beutel et al. |
| 2004/0050037 A1 | 3/2004 | Betta et al. |
| 2004/0055278 A1 | 3/2004 | Miyoshi et al. |
| 2004/0060284 A1 | 4/2004 | Roberts, Jr. et al. |
| 2004/0074226 A1 | 4/2004 | Tanaka |
| 2004/0089279 A1 | 5/2004 | McLaughlin et al. |
| 2004/0118117 A1 | 6/2004 | Hartman et al. |
| 2004/0128058 A1 | 7/2004 | Andres et al. |
| 2004/0129259 A1 | 7/2004 | Mitsutani |
| 2004/0134464 A1 | 7/2004 | Mogi |
| 2004/0135584 A1 | 7/2004 | Nagy et al. |
| 2004/0139735 A1 | 7/2004 | Zhu |
| 2004/0139951 A1 | 7/2004 | Fisher et al. |
| 2004/0226287 A1 * | 11/2004 | Edgar et al. .................. 60/295 |
| 2004/0249558 A1 | 12/2004 | Meaney |
| 2005/0145023 A1 | 7/2005 | Rhodes et al. |
| 2008/0041035 A1 * | 2/2008 | Sawada et al. ............... 60/277 |
| 2008/0053067 A1 * | 3/2008 | Schmidt et al. ............... 60/276 |

FOREIGN PATENT DOCUMENTS

| | | |
|---|---|---|
| EP | 0525566 | 2/1993 |

| | | |
|---|---|---|
| FR | 2805347 | 8/2001 |
| GB | 2395567 | 5/2004 |
| WO | WO 02/101208 | 12/2002 |
| WO | WO 2004/027230 | 4/2004 |

OTHER PUBLICATIONS

Advanced Petroleum-Based Fuels-Diesel Emissions Control (APBF-DEC) Project, "Quarterly Update," No. 7, 6 pages, Fall 2002.

Allanson, et al., "Optimizing the Low Temperature Performance and Regeneration Efficiency of the Continuously Regenerating Diesel Particulate Filter System," SAE Paper No. 2002-01-0428, 8 pages, Mar. 2002.

Amstuz, et al., "EGO Sensor Based Robust Output Control of EGR in Diesel Engines," IEEE TCST, vol. 3, No. 1, 12 pages, Mar. 1995.

Bemporad, et al., "Explicit Model Predictive Control," 1 page, prior to fiing date of present application.

Borrelli, "Constrained Optimal Control of Linear and Hybrid Systems," Lecture Notes in Control and Information Sciences, vol. 290, 2003.

Catalytica Energy Systems, "Innovative NOx Reduction Solutions for Diesel Engines," 13 pages, $3^{rd}$ Quarter, 2003.

Chatterjee, et al. "Catalytic Emission Control for Heavy Duty Diesel Engines," JM, 46 pages, prior to fiing date of present application.

Delphi, Delphi Diesel NOx Trap (DNT), 3 pages, Feb. 2004.

GM "Advanced Diesel Technology and Emissions," powertrain technologies—engines, 2 pages, prior to fiing date of present application.

Guzzella, et al., "Control of Diesel Engines," IEEE Control Systems Magazine, pp. 53-71, Oct. 1998.

Havelena, "Componentized Architecture for Advanced Process Management," Honeywell International, 42 pages, 2004.

Hiranuma, et al., "Development of DPF System for Commercial Vehicle—Basic Characteristic and Active Regeneration Performance," SAE Paper No. 2003-01-3182, Mar. 2003.

Honeywell, "Profit Optimizer A Distributed Quadratic Program (DQP) Concepts Reference," 48 pages, prior to fiing date of present application.

http://www.not2fast.wryday.com/turbo/glossary/turbo_glossary. shtml, "Not2Fast: Turbo Glossary," 22 pages, printed Oct. 1, 2004.

http://www.tai-cwv.com/sbl106.0.html, "Technical Overview-Advanced Control Solutions," 6 pages, printed Sep. 9, 2004.

Kelly, et al., "Reducing Soot Emissions from Diesel Engines Using One Atmosphere Uniform Glow Discharge Plasma," SAE Paper No. 2003-01-1183, Mar. 2003.

Kolmanovsky, et al., "Issues in Modeling and Control of Intake Flow in Variable Geometry Turbocharged Engines", $18^{th}$ IFIP Conf. System Modeling and Optimization, pp. 436-445, Jul. 1997.

Kulhavy, et al. "Emerging Technologies for Enterprise Optimization in the Process Industries," Honeywell, 12 pages, Dec. 2000.

Locker, et al., "Diesel Particulate Filter Operational Characterization," Corning Incorporated, 10 pages, prior to fiing date of present application.

Lu "Challenging Control Problems and Engineering Technologies in Enterprise Optimization," Honeywell Hi-Spec Solutions, 30 pages, Jun. 4-6, 2001.

Moore, "Living with Cooled-EGR Engines," Prevention Illustrated, 3 pages, Oct. 3, 2004.

National Renewable Energy Laboratory (NREL), "Diesel Emissions Control- Sulfur Effects Project (DECSE) Summary of Reports," U.S. Department of Energy, 19 pages, Feb. 2002.

Salvat, et al., "Passenger Car Serial Application of a Particulate Filter System on a Common Rail Direct Injection Engine," SAE Paper No. 2000-01-0473, 14 pages, Feb. 2000.

Shamma, et al. "Approximate Set-Valued Observers for Nonlinear Systems," IEEE Transactions on Automatic Control, vol. 42, No. 5, May 1997.

Soltis, "Current Status of NOx Sensor Development," Workshop on Sensor Needs and Requirements for PEM Fuel Cell Systems and Direct-Injection Engines, 9 pages, Jan. 25-26, 2000.

Stefanopoulou, et al., "Control of Variable Geometry Turbocharged Diesel Engines for Reduced Emissions," IEEE Transactions on Control Systems Technology, vol. 8, No. 4, pp. 733-745, Jul. 2000.

Storset, et al., "Air Charge Estimation for Turbocharged Diesel Engines," vol. 1 Proceedings of the American Control Conference, 8 pages, Jun. 28-30, 2000.

The MathWorks, "Model-Based Calibration Toolbox 2.1 Calibrate complex powertrain systems," 4 pages, printed prior to filing date of present application.

The MathWorks, "Model-Based Calibration Toolbox 2.1.2," 2 pages, prior to filing date of present application.

Theiss, "Advanced Reciprocating Engine System (ARES) Activities at the Oak Ridge National Lab (ORNL), Oak Ridge National Laboratory," U.S. Department of Energy, 13 pages, Apr. 14, 2004.

Zenlenka, et al., "An Active Regeneration as a Key Element for Safe Particulate Trap Use," SAE Paper No. 2001-0103199, 13 pages, Feb. 2001.

* cited by examiner

SYSTEM FOR PARTICULATE MATTER SENSOR SIGNAL PROCESSING

This invention may have been conceived or made with government support under U.S. DOE NETL contract number DE-FC04-02AL-67636. The U.S. Government has certain rights in the invention.

BACKGROUND

The invention pertains to processing particle sensor data and particularly to data of engines. More particularly, the invention pertains to processing particle mass sensor data of engine exhaust events.

SUMMARY

The invention may include a processor for analysis of exhaust events of an engine to attain information about the engine's operation.

DESCRIPTION

Real-time exhaust events from individual diesel engine cylinders can provide a particular perspective into an engine's operation. Processing data about the exhaust events may reduce the real-time behavior of particulate emissions into usable control signals. The processing (e.g., algorithms) may use a combination of time-windowed (time domain) and frequency domain analysis of the real-time exhaust particulates to create profiles of the individual cylinder behavior in order to compare one cylinder to another and to compare one engine cycle to another. Instantaneous and time averaged results may be useful. Individual cylinder variations from one engine cycle to another cycle and variations among cylinders may be indicative of poor engine operation. These variations may be controlled for better overall performance and lower overall emissions. Other useful information such as engine running speed and exhaust flow rate, which are typically difficult to measure directly, may also be deduced from the time and/or frequency domain data.

The smoke emitted from a diesel engine is normally charged as a weak plasma generated in the combustion process. The charged particulates emitted from the cylinder during the exhaust cycle stream pass a conductive probe connected to a charge amplifier which records the concentration of particles as a function of time (i.e., time-domain). A signal representing this concentration may then be digitized and passed to a microprocessor for analysis. Data collected by the microprocessor, possibly coupled with a synchronizing signal from the engine control unit (ECU), may be time windowed and pulses from individual cylinders identified and analyzed for a baseline, peak height and integrated peak area. These may be direct measures of particulate matter (PM) emitted from an individual cylinder. The real time data stream may also be converted to the frequency domain by the use of Fourier transform, sine-cosine analysis, La Place transform, and so on. In the frequency domain, the primary frequency peak may be a measure of the engine running speed, and the peak height may be related to the total particulates. This signal processing is needed for signal amplification, noise reduction, and to clarify the charge signal. In a properly running engine where all of the cylinders are equally timed and of equal magnitude, there may be few harmonic frequencies. In poorly running engines, the non-repetitive nature of the cylinder-to-cylinder and cycle-to-cycle variability may cause many harmonic frequencies and overtones.

Figure 1A:
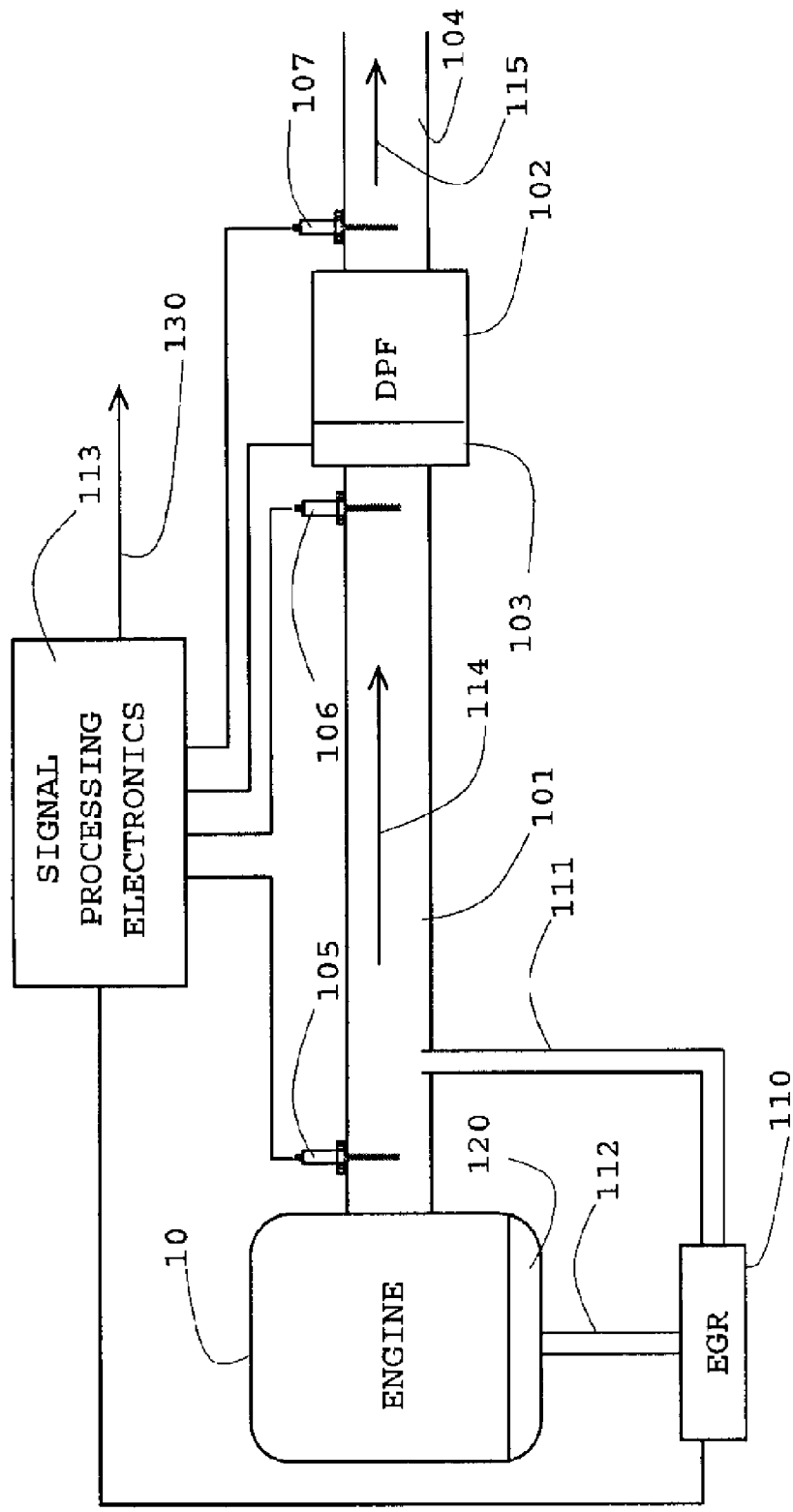
FIG. 1a is a diagram of a particulate matter sensor arrangement for an engine exhaust system.

FIG. 1a shows a particulate matter sensor arrangement for an exhaust system of an engine 10. Engine 10 may have an exhaust pipe 101 which is connected to the exhaust system of engine 10 and to a particulate matter (PM) or diesel particulate filter (DPF) 102. Associated with and situated adjacent to the DPF 102 may be a controller 103 and/or heater 103 for operation of the DPF 102, such as the heater 103 being turned on in the DPF 102 to control the temperature of the DPF 102 for operation and/or to burn off trapped diesel particulates or particulate matter. Particulate matter sensors 105 and/or 106 may be situated in the exhaust pipe 101. Sensor 105 may be closer to the engine 10 than sensor 106. In some arrangements, just one of sensor 105 or 106 may be present. A tail pipe 104 may be connected to the output of the DPF 102. Situated in the tailpipe 104 may be a particulate matter sensor 107.

An EGR valve 110 may have an exhaust gas conveyance 111 such as a pipe or tube connected to the exhaust pipe 101 and an exhaust gas conveyance device 112 such as a pipe or tube connected to an intake system 120 of the engine 10. Sensor 105 may be connected proximate to tube 111. Sensor 106 may be connected proximate to the input of the DPF 102. In summary, sensors 105 and 106 may be regarded as upstream from DPF 102 and sensor 107 as downstream relative to DFP 102. Sensors 105, 106 and/or 107 may be connected to a signal processing electronics module 113 for providing signals indicating an amount or mass of sensed particulate matter or diesel particulates in an exhaust gas stream 114 before entering DPF 102 and in an exhaust gas stream 115 after DPF 102, respectively. EGR valve 110 may be connected to the signal processing electronics 113 for receiving signals to open or close the valve 110, as indicated by the signals from sensors 105 and/or 106. Sensor 107 may be primarily for determining the presence of particulate matter in the exhaust gas stream 115 and for indicating whether the DPF 102 is in a failure mode or has failed. Particulate matter in the exhaust gas stream 115 may be an indication of a failed or non-working DPF 102. For a well-operating DPF 102, sensor 107 should not be detecting any particulate matter in stream 115.

Signal processing electronics module or processor 113 may output signals 130 having information about exhaust flow velocity, amount of loading of the PM filter, failure indication of the PM filter, time to clean the PM filter, optimal EGR operation, and so forth.

Sensor 105 or sensor 106 may be used for determining the loading of the DPF 102. Sensor 105 may also be used for controlling the EGR valve 110 so as to reduce exhaust emissions in stream 114. However, sensor 106 may generally be used for merely determining the loading of the DPF 102. Either sensor 105 or 106, or both sensors, along with signal processing electronics 113, may provide sensor signals which are integrated mathematically over time so as to determine the total mass accumulation of particulate matter in the DPF 102. Since an actual determination of the amount of particulate matter in the DPF 102 may be obtained with the present system, a model and/or related calculation is not necessarily needed for obtaining, for instance, an estimated determination of particulates or particulate matter in the DPF 102.

Figure 1B:
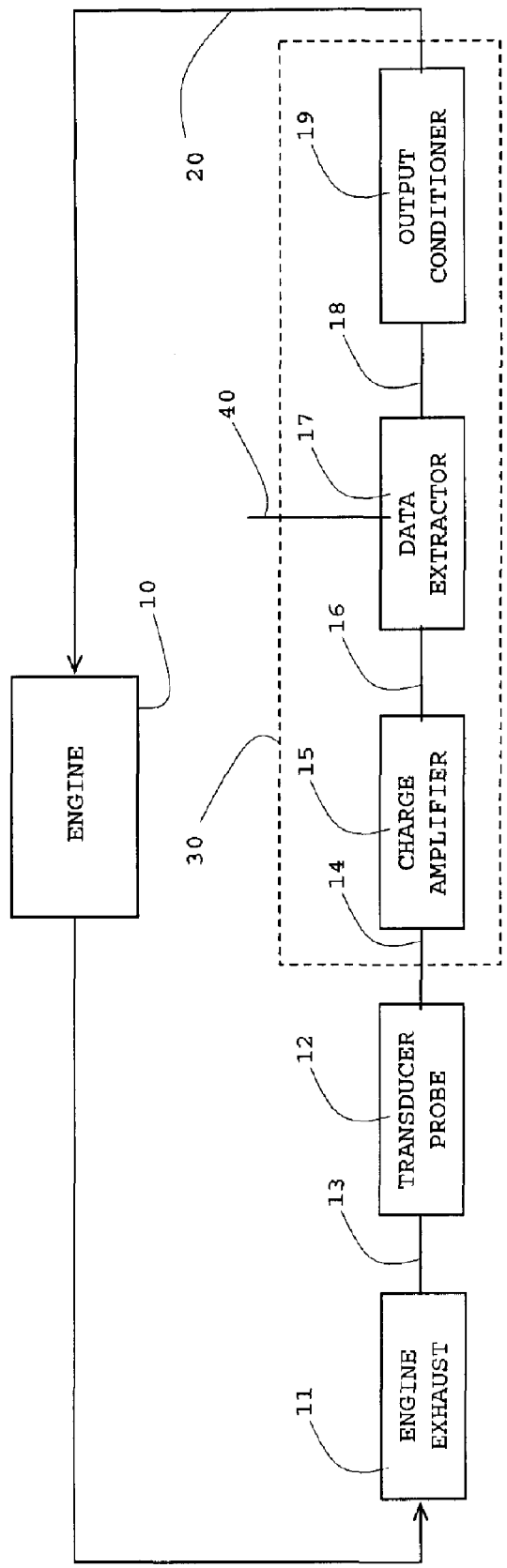
FIG. 1b is shows a flow diagram of data acquisition and processing for an engine.

FIG. 1b shows a flow diagram of data acquisition and processing for engine 10. The diagram may also be regarded as a version of a loop for engine control based on the particulate matter of the exhaust emissions. Engine 10 may output an exhaust 11 which is sensed for particulate matter and other engine-related data by a transducer probe 12. In the engine exhaust 11 may be a particulate matter (PM) concentration in the may be detected in the gas composition 13. Other parameters that may be detected in the exhaust include, but not limited to, pressure, temperature, vibration, engine speed, percent of exhaust gas recirculation (EGR), and oil type. Three different engines 10 under test have included a John Deere™ 4045T implement, a Caterpillar™ C12 truck engine, and a Volkswagon TDI Euro IX engine. The 4045T is a turbocharged 4.5 liter diesel, the C12 is a naturally aspirated 12.0 liter diesel, and the TDI is a 1.9 liter diesel. This variety of engines for testing may validate some of the consistent results of data acquisition and analysis.

Figure 2A:
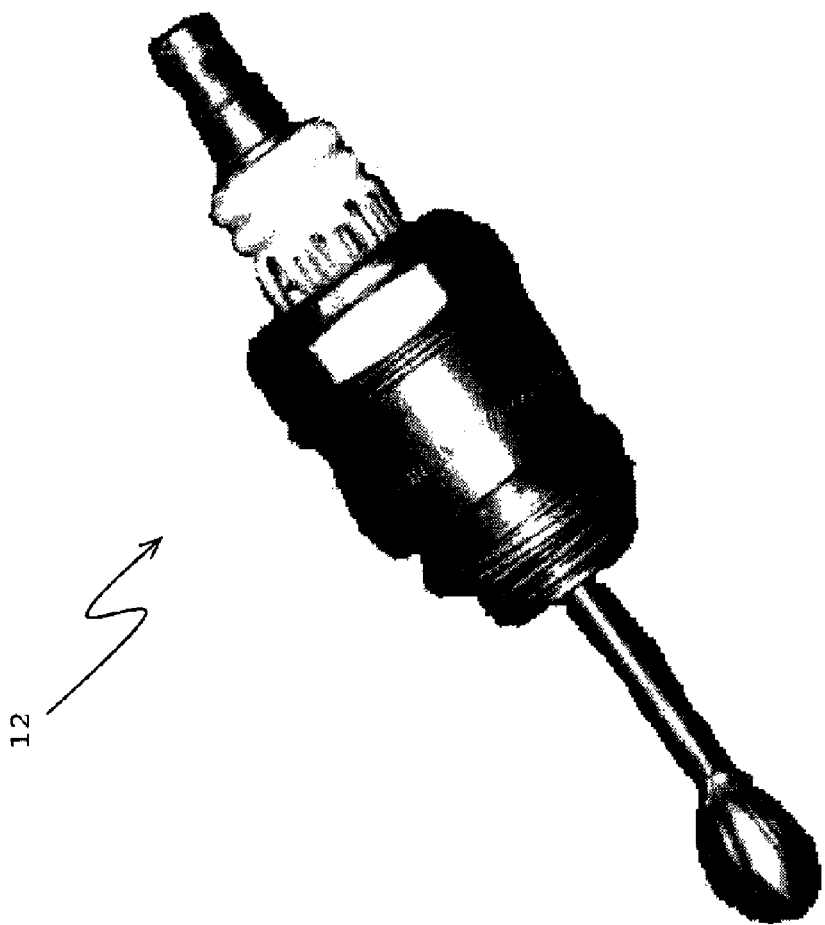
FIG. 2a reveals a particulate matter transducer having a spark-plug-like support and bulb-like probe.
Figure 2B:
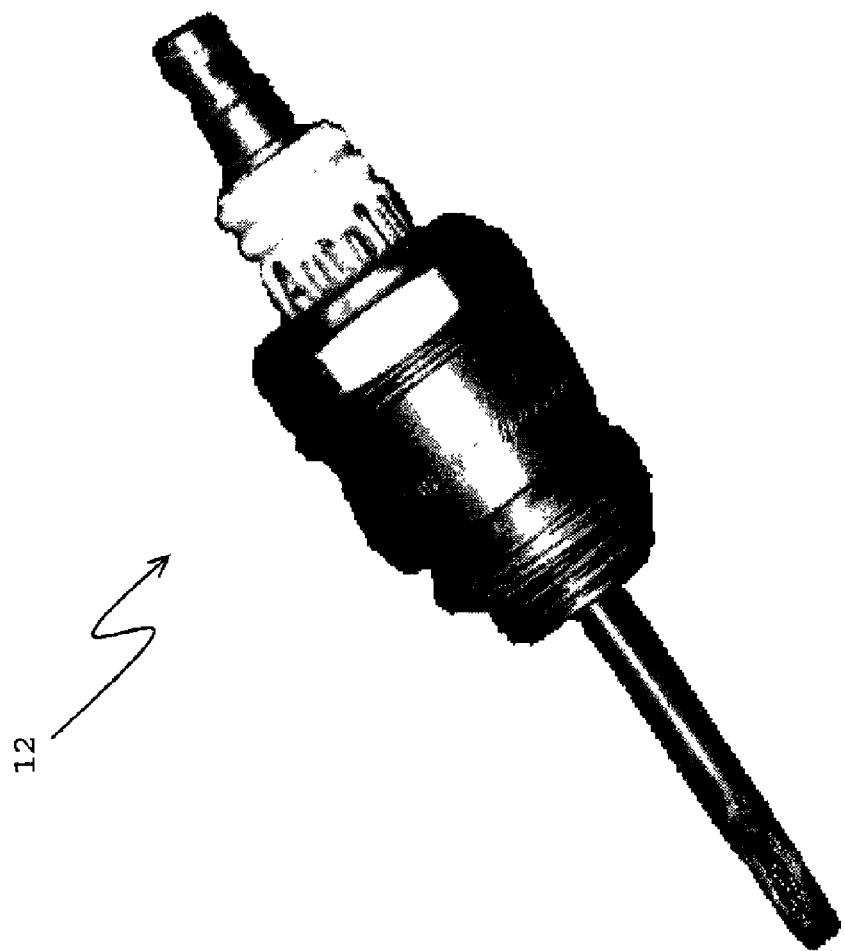
FIG. 2b reveals a particulate matter transducer having a spark-plug-like support and shaft-like probe.

The PM transducer probe 12 may have a spark-plug-like support as shown in FIG. 2. The PM probe 12 may provide an output based on the charge measured by the probe. Probe 12 may be placed in a path of the exhaust 11 of the engine 10. The length and geometry of probe 12 may vary depending on the parameters of the sensing electronics, sensor optimization, and the engine. Probe 12 may be passivated with a very thin nonconductive coating or layer. This coating or layer may prevent electrical shorting by the soot layer accumulated on the probe 12 during the operation of engine 10. The passivation material may be composed of $S_iN_4$, cerium or other oxide, and/or the like. The thickness of the passivation layer on probe 12 may be between 0.001 and 0.010 inch. A nominal thickness may be about 0.01 inch. The passivation layer may be achieved with the probe exposed to high exhaust temperatures or may be coated with a layer via a material added to the engine's fuel.

Sensor or probe 12 may have various dimensions and electrode shapes. Examples of a length dimension may be between 0.25 and 12 inches. A nominal value of the length may be about 3 to 4 inches. Examples of a thickness or diameter dimension may be between $1/32$ inch and $3/8$ inch. A nominal thickness may be about $1/8$ inch. The probe may also be non-cylindrical or may have a ball at the end of the probe to optimize the signal.

An example of the probe may include a standard spark plug housing that has the outside or ground electrode removed and has a 4 to 6 inch metal extension of about $1/8$ inch thickness or diameter welded to a center electrode. Sensor 12 may be mounted in the exhaust stream 11 near the exhaust manifold or after the turbocharger of the engine 10. The sensing electrode may be connected to an analog charge amplifier 15 of a processing electronics 30. The charge transients 14 from the electrode or probe 12 may be directly proportional to the soot (particulate) concentration in the exhaust stream 11. The extended electrode may be passivated with a very thin nonconducting layer on the surface of the electrode exposed to the exhaust gas 11 of the engine 12. A 304 type stainless steel may grow the passivating layer on the probe 12 spontaneously after a few minutes of operation in the exhaust stream at temperatures greater than 400 degrees C. (750 degrees F.). However, a passivating layer of cerium oxide may instead be grown on the probe or electrode 12 situated in the exhaust 11, by adding an organometallic cerium compound (about 100 PPM) to the fuel for the engine 10.

Other approaches of passivating the probe or electrode 12 with a layer may include sputter depositing refractory ceramic materials or growing oxide layers in controlled environments. Again, the purpose of growing or depositing the passivating layer on probe or electrode 12 situated in the exhaust 11 is to prevent shorts between the probe and the base of the spark-plug like holder due to PM buildups, so that sensor or probe 12 may retain its image charge monitoring activity of the exhaust stream 11. If the electrode did not have the passivating layer on it, probe 12 may fail after a brief operating period because of an electrical shorting of the electrode to the support base of the sensor due to a build-up of soot or PM on the electrode.

Processing electronics 30 may include charge amplifier 15, a data extractor 17, an output conditioner 19, or other averaging or FFT processing electronics. Charge amplifier 15 of FIG. 1 may be designed and situated in terms of gain, frequency response, and location. The output 16 may be a real-time signal indicating the amount of PM in the exhaust 11. Signal 16 may go to a data extractor unit 17. A crankshaft angle signal may be entered at input 40 of unit 17 for associating the specific amounts of PM at particular crankshaft angles for engine 10 analysis. An output 18 may provide an average PM concentration of exhaust 11. Also, PM concentrations on a cylinder-by-cylinder basis may be revealed at output 18.

Output 18 may go to an output conditioner unit 19, which may provide an engine control, diagnostic and/or engine control voltage signal 20 which may go to engine 10 or DPF loading or failure determination.

Figure 3:
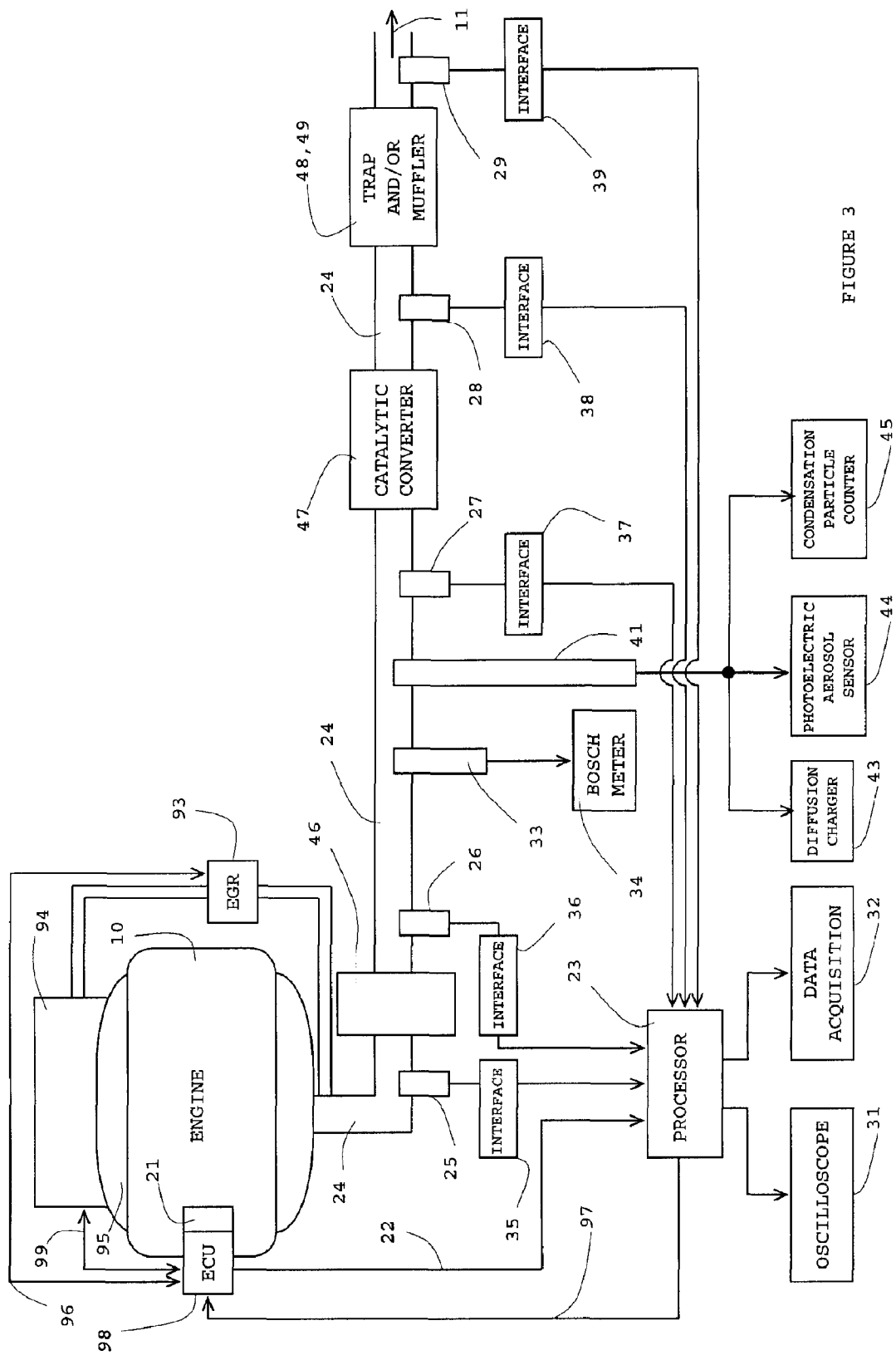
FIG. 3 is a schematic of a data acquisition arrangement for an engine.

FIG. 3 is a schematic of a data acquisition arrangement for an engine 10. Sensor module 21 on engine 10 may provide engine data 22 via an engine control unit (ECU) 98 to a processor 23. ECU 98 may have a bidirectional connection 99 to fuel and air intake system 94 which includes an intake manifold 95. Also, ECU 98 may have a bidirectional connection 96 to an exhaust gas recirculation unit 93. ECU 98 may have an input connection 97 from an output of the processor 23. Data 22 may include information relative to engine parameters of RPM, load, turbocharger pressure (except the VW™), needle lift (Deere™ only), crank angle, and other parameters about the engine. An exhaust system 24, including an exhaust manifold 92, for conveying exhaust gas 11, may have sensors 25, 26, 27, 28 and 29 connected to processor 23. An output of processor 23 may go to an oscilloscope 31 for data readings and plot observation and to a data acquisition (DAQ) module 32. Sensors 25-29 may have amplifier, converter interface, and/or conditioning circuits 35-39, respectively, to prepare the signal for entry to processor 23. There may be a smoke sensor probe 33 in exhaust system 24 connected to a Bosch™ meter 34. A two-stage dilution tunnel 41 may be situated at exhaust system 24 for providing a connection to a diffusion charger (DC) 43, a photoelectric aerosol sensor (PAS) 44 and a condensation particle counter (CPC) 45.

A device 46 may be situated between sensors 25 and 26. The Bosch™ meter probe 33 and the two-stage dilution tunnel may be situated between sensors 26 and 27. A catalytic converter 47 (used for the VW™ engine) may be situated between sensors 27 and 28. Between sensors 28 and 29 may be a PM trap 48 (for the Caterpillar™ engine) or a muffler 49 (for the VW™ engine) situated in exhaust system 24. With the described data acquisition system in FIG. 3, various data and plots may be taken as shown in the ensuing Figures.

Figure 4:
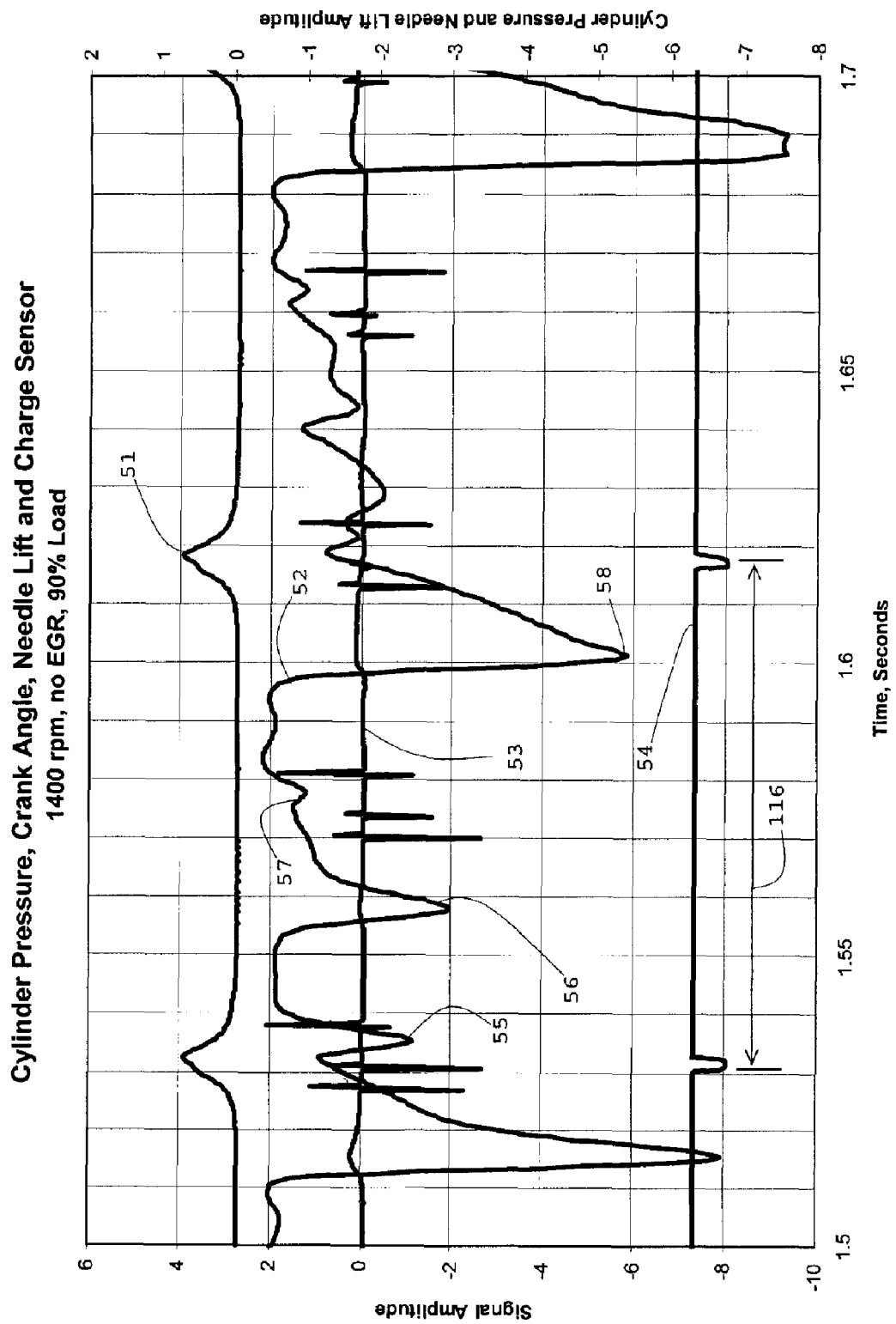
FIG. 4 is a plot of data of an engine indicating cylinder pressure, crank angle, needle lift and soot concentration.

FIG. 4 is a plot of data taken from the Deere™ engine 10 showing cylinder pressure, crank angle, needle lift and soot at 1400 rpm, with no EGR and a 90 percent load versus time on the abscissa axis. Cylinder pressure is shown by a curve 51 and indicated by relative figures on the right ordinate axis. Curve 52 shows signal amplitude from a PM charge sensor by figures on the left ordinate axis. Curve 53 is a crank angle line. Curve 54 reveals needle lift with relative magnitude revealed in the right ordinate axis. Indicator line 116 indicates one engine cycle along the abscissa of the graph. Downward spikes of curve 52 may identify action of cylinders 1, 2, 3 and 4 as indicated by designations 55, 56, 57 and 58, respectively. Data for curves 51, 53 and 54 may come from the sensor module 21. The data for curve 52 may come from soot charge sensor 25.

Figure 5A:
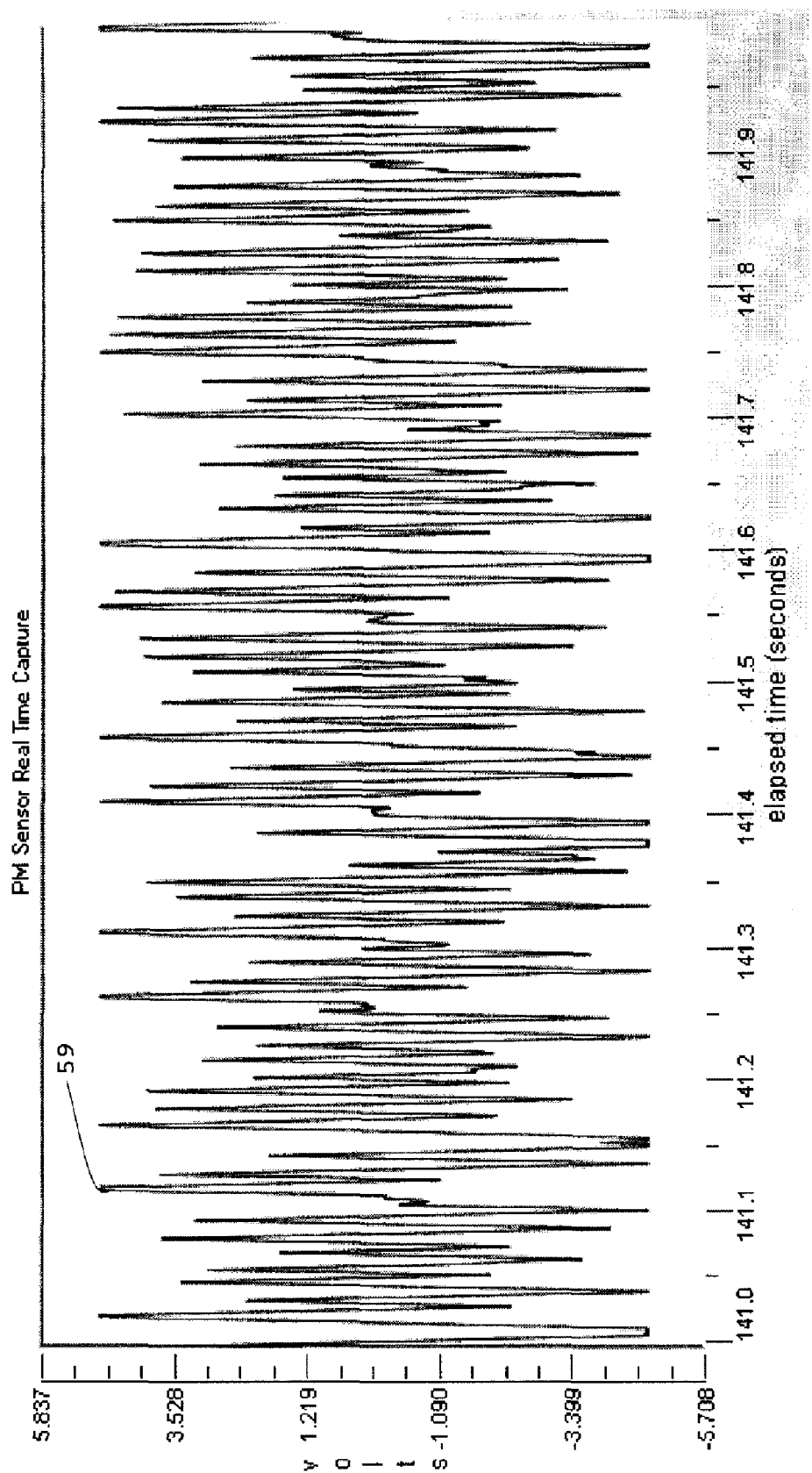
FIG. 5a reveals real time capture by a particulate matter sensor in terms of volts versus time.
Figure 5B:
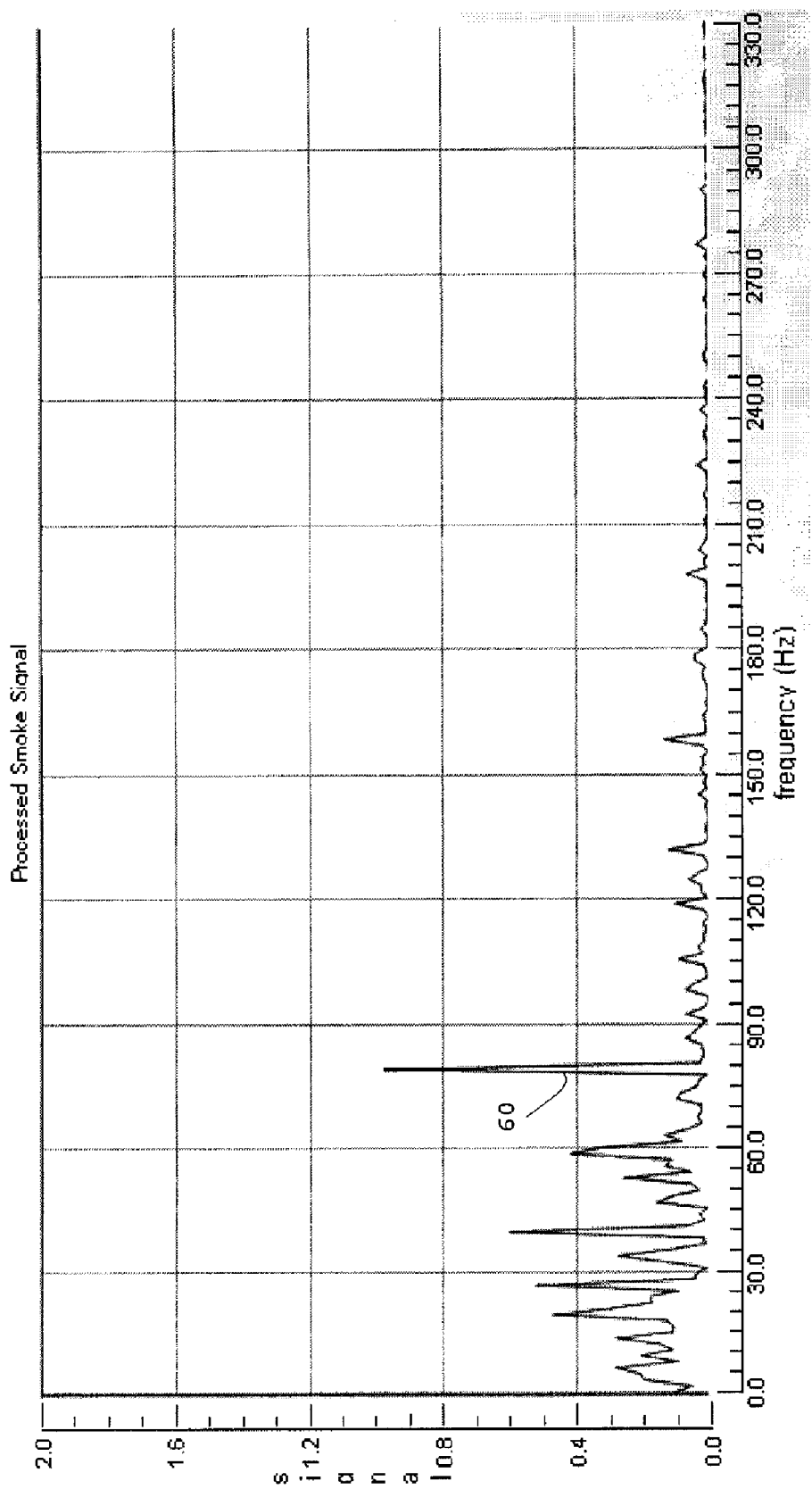
FIG. 5b shows a waveform of signal to frequency of a processed smoke signal.
Figure 5C:
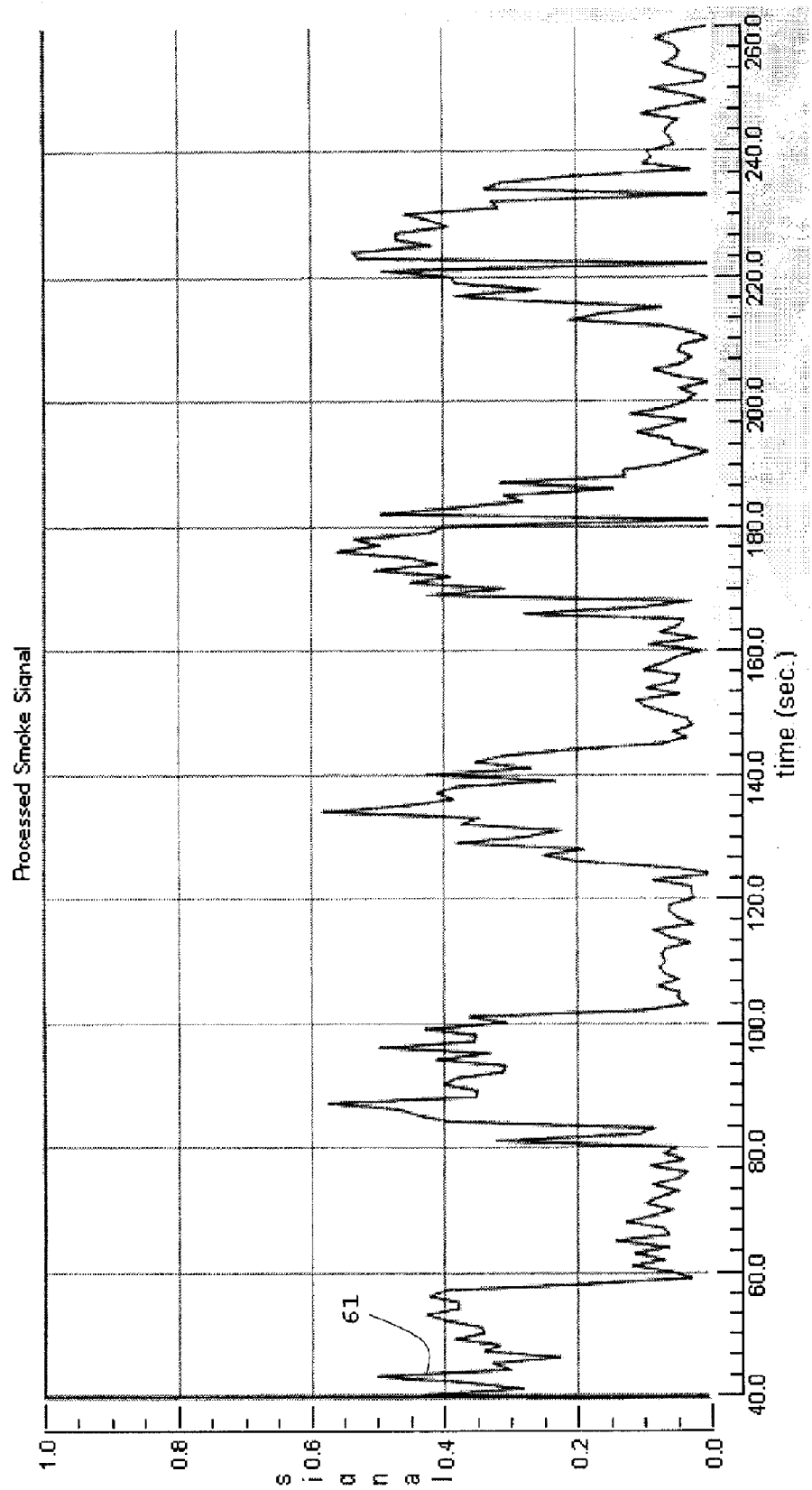
FIG. 5c shows a waveform of signal to time of a processed smoke signal.

FIG. 5a reveals real time capture by a particulate matter sensor in terms of volts versus time with curve 59. FIG. 5b shows a waveform 60 of signal to frequency of a processed smoke signal. FIG. 5c shows a waveform 61 of signal to time of a processed smoke signal.

Figure 6:
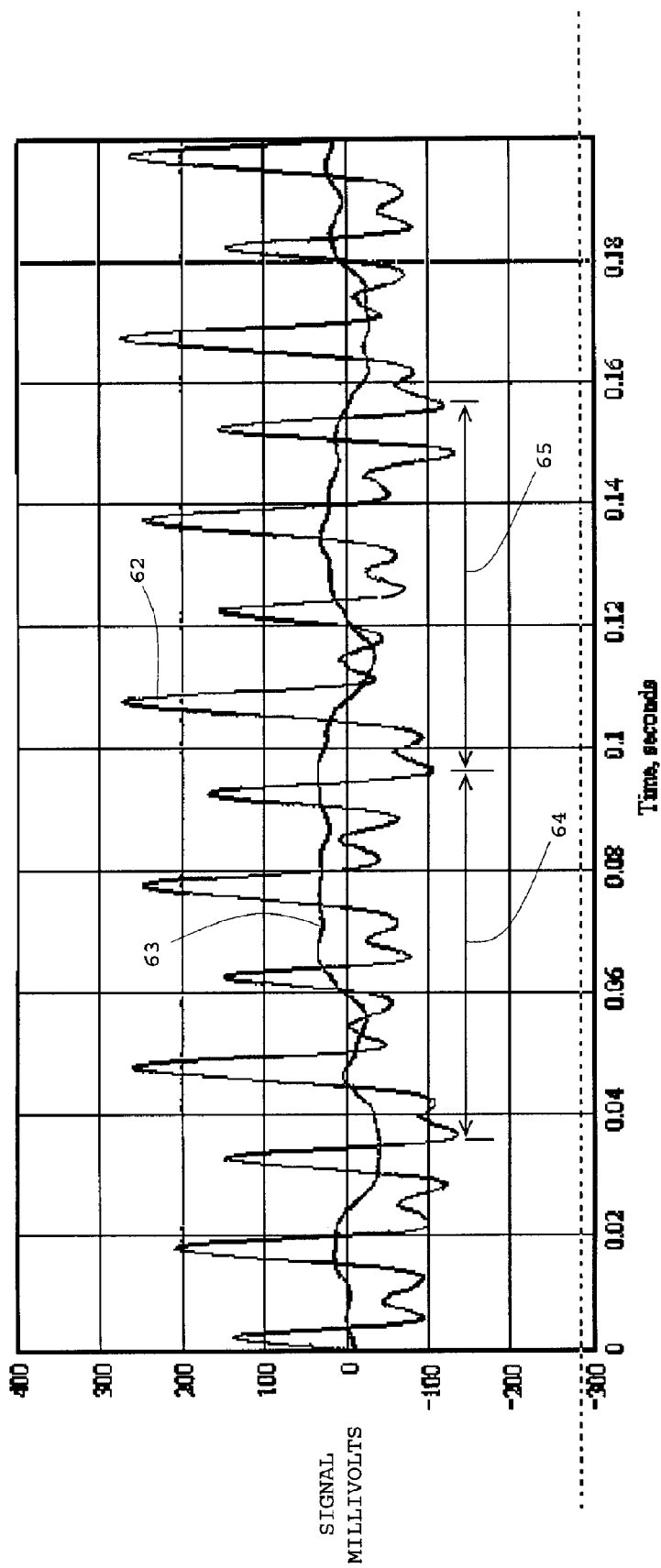
FIG. 6 reveals a charge sensor signal upstream and downstream of a catalytic converter of an engine.

FIG. 6 reveals the charge sensor signal upstream of the catalytic converter 47 by curve 62 as indicated by charge sensor 27 and by curve 63 as indicated by sensor 28 for the VW™ TDI Euro IV engine. The graph is in terms of signal millivolts versus decimal fractions of seconds. Dimensions 64 and 65 indicate a cycle of the VW™ engine 10, each of which are about 0.06 seconds and equivalent to about 2000 RPM.

Figure 7A:
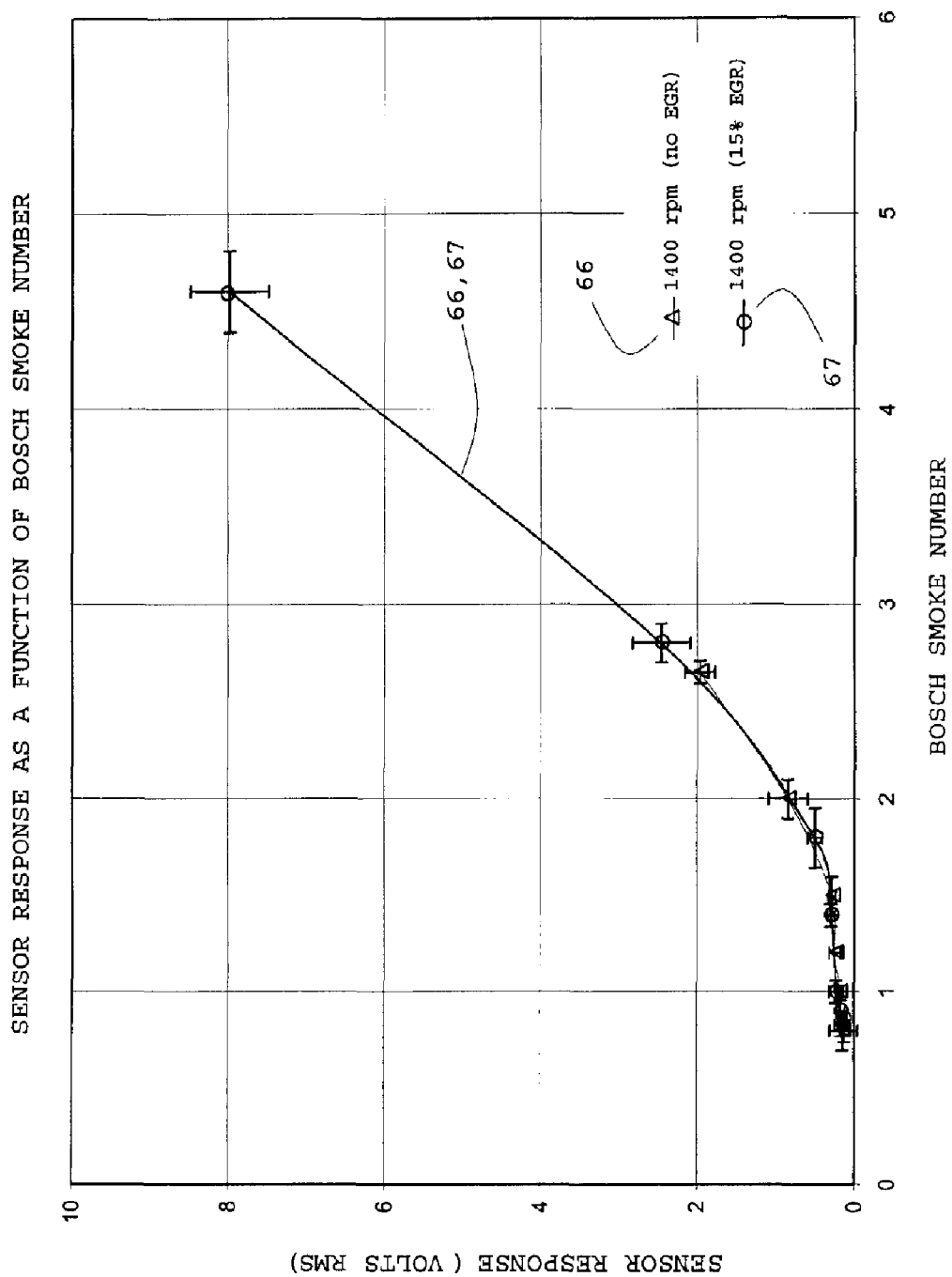
FIG. 7a is a graph of a sensor response as a function of a Bosch smoke number for an engine.

FIG. 7a is a correlation and/or sensor response as a function of a Bosch smoke number for the Deere™ engine running at 1400 RPM with no EGR as indicated by triangles and with 15 percent of EGR as indicated by circles. It may be noted that correlation of data points or curves 66 and 67, respectively, for non EGR and some EGR is relatively good. The graph shows the sensor response of, for instance sensor 26, in volts RMS versus the Bosch smoke number. At the start of curves 66 and 67, up to about Bosch smoke number 2, a little change in sensor voltage seems to cause a large change in the Bosch smoke number. The greatest disparity between curves 66 and 67 appears before the smoke number 2. After the Bosch smoke number 2, the relationship between the sensor responses appears almost linear.

Figure 7B:
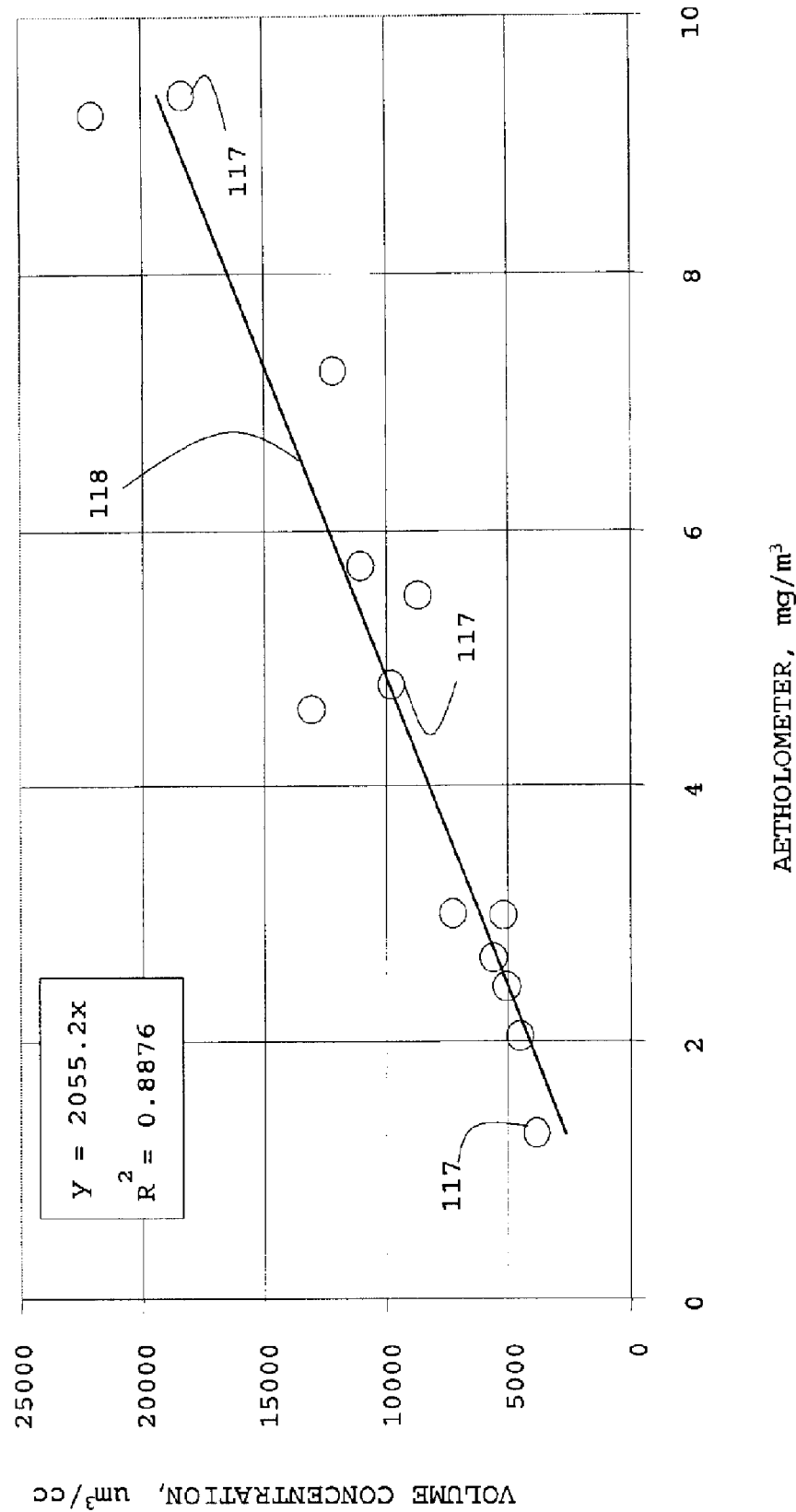
FIG. 7b is a graph of volume concentration versus an aetholometer reading for a certain load.
Figure 7C:
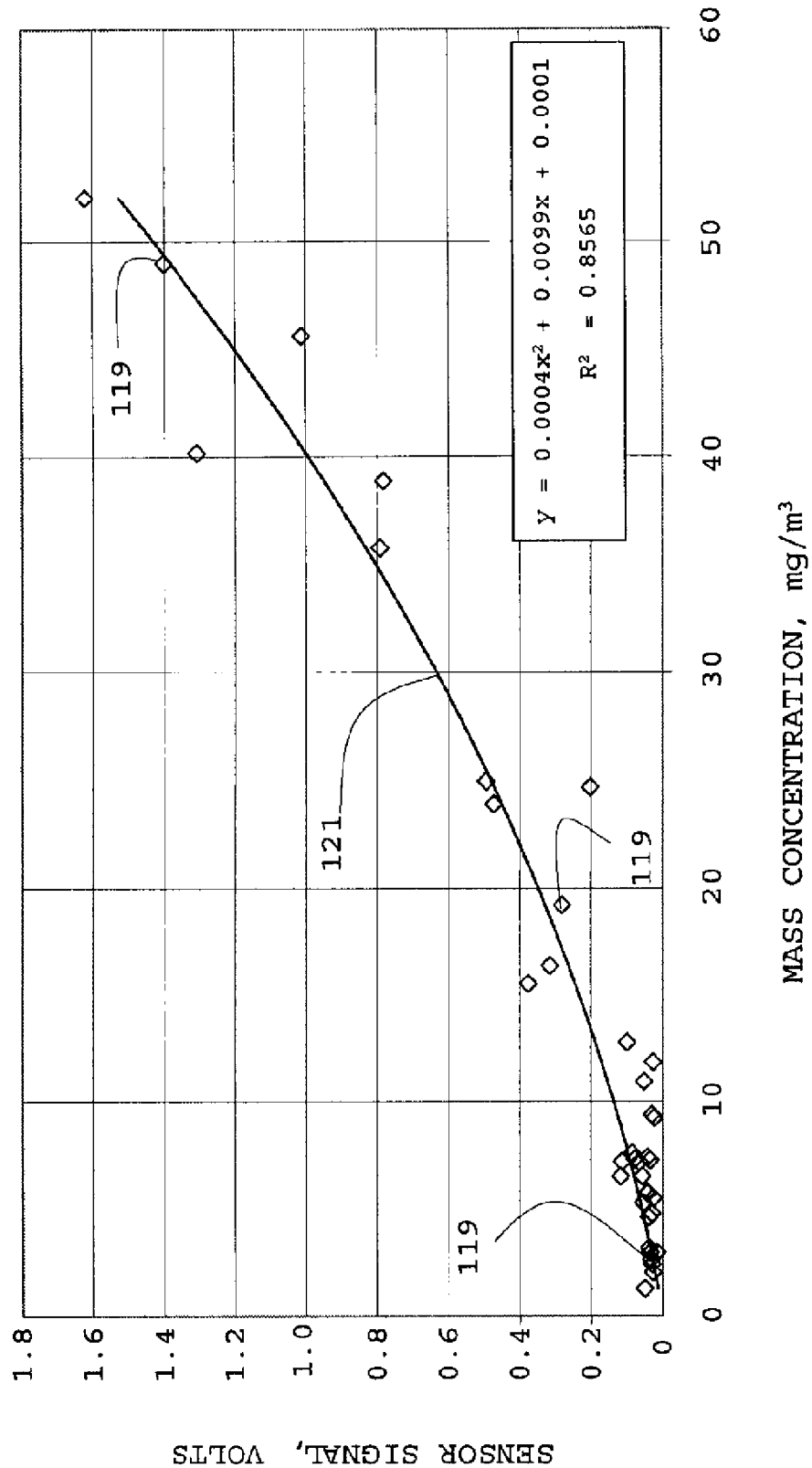
FIG. 7c is a graph of sensor signal versus mass concentration of particulate matter.

FIG. 7b is a graph showing volume concentration ($\mu m^3$ per cc) versus an aetholometer reading (mg per $m^3$) for a comparison of 10 percent and 25 percent loads. An aetholometer is a real time instrument that responds to black carbon. The data 117 may be fitted with a curve 118 having an equation "y=2022.2x". A correlation "$R^2$" of the curve to the data is about 0.8876. FIG. 7c is a graph showing a sensor signal in volts versus a mass concentration in mg per $m^3$. The signal to mass relationship data 119 were fitted to a curve 121 have a relationship expressed by the equation "y=0.0004×2+ 0.0099×+0.0001". The correlation "R2" of the curve to the data is about 0.8565.

Figure 8:
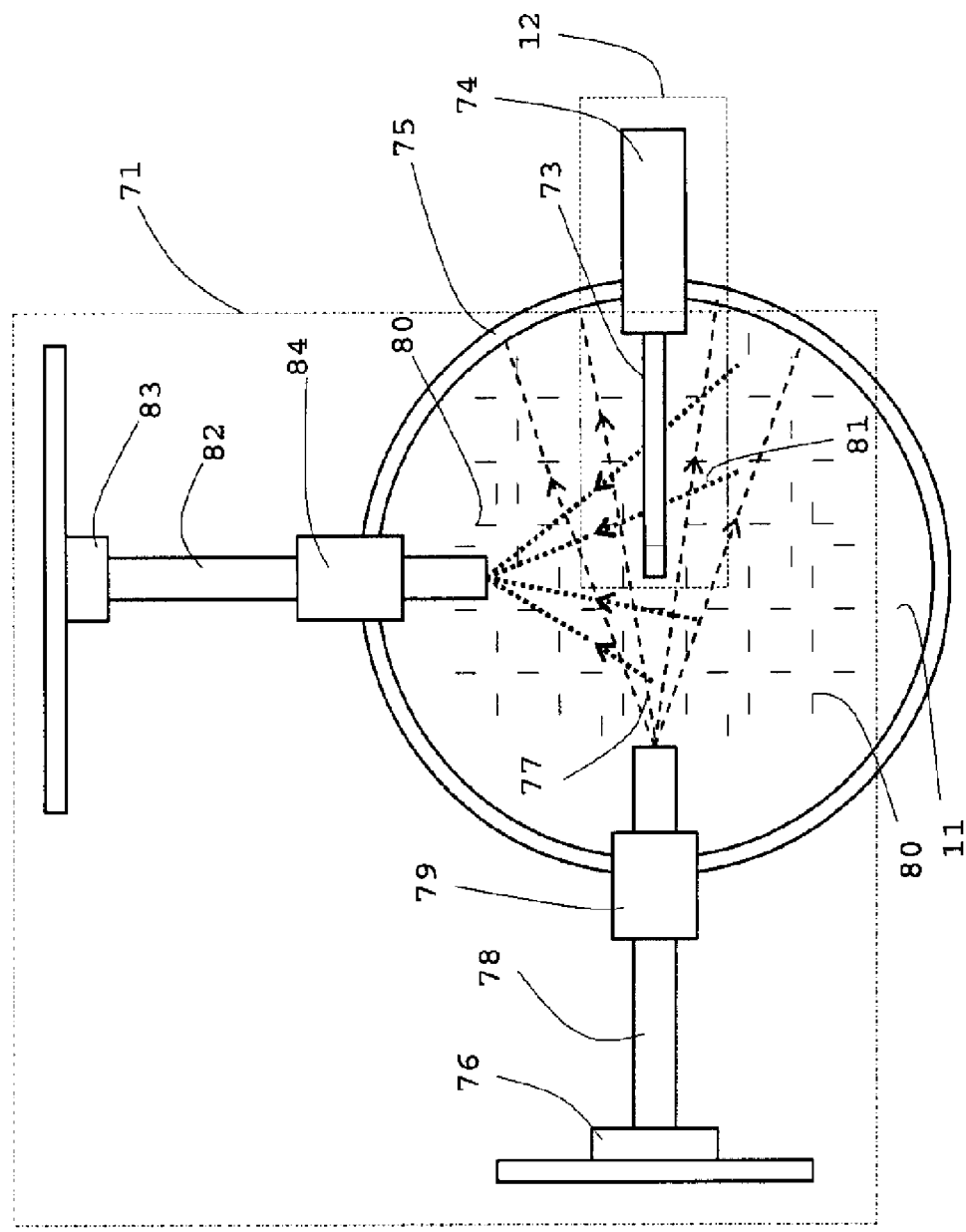
FIG. 8 reveals co-location an optical particulate detector and a particulate charge sensor in an exhaust pipe.

FIG. 8 reveals an optical PM detector 71 and a PM charge sensor 12 in an exhaust pipe 75. PM charge sensor or probe 12 may have an electrode 73 and a housing 74 to support the electrode 73 and a housing 74 to support the electrode 73 in an exhaust pipe 75. The optical PM sensor 71 may have a light source 76, a bright red LED (e.g., a Lumex™ no. LTL-2F3VRNKT). Light 77 may be transmitted through a quartz rod 78 to inside of the exhaust pipe 75. A holder or support housing 79 may support the quartz rod 78 in exhaust pipe 75. Rod 78 may be about ¼ inch in diameter and 4 inches long. Light rays 77 may impinge PM particles 80 in the exhaust stream 11 and reflect light rays 81 which may be conveyed by a quartz rod 82 to a light detector 83 (e.g., a Burr-Brown™ photodiode no. OPT301). Rod 82 may have similar dimensions as rod 78. Rod 82 may be supported by a holder or support housing 84 in exhaust pipe 75. An increase of a number of PM particles 80 per unit volume of exhaust 11 may indicate an increase of reflected light 81 to detector 83 for a greater reading, and vice versa. Rods 78 and 82 may operate as thermal isolations between the hot exhaust pipe 75 and the emitter 76 and detector 83 electronics, respectively. In tests using sensor 71 that may be noted in this description, no attempts are made to keep rods 78 and 82 clean in the exhaust pipe 75.

Figure 9:
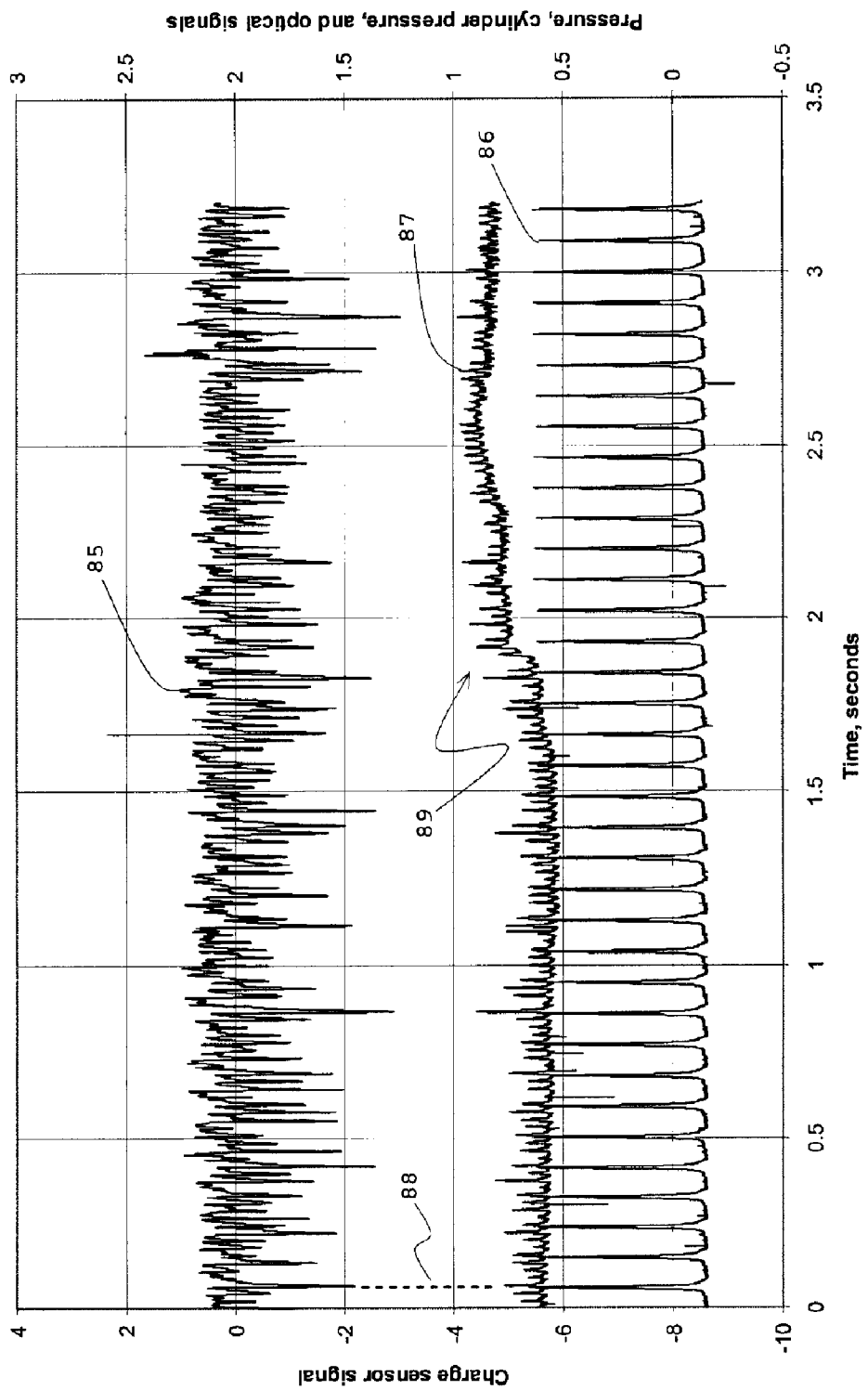
FIG. 9 is a graph of a charge sensor signal, cylinder pressure signal, and an optical sensor signal for an emission stream from an engine.

FIG. 9 is a graph of a charge sensor 12 signal 85, cylinder pressure signal 86, and an optical sensor 71 signal 87 showing magnitude versus time in seconds on the abscissa axis for the Deere™ engine 10. The left ordinate axis shows the magnitude of the charge sensor 12 signal 85. The right ordinate axis shows the magnitude of the cylinder pressure signal 86 and the optical sensor 71 signal 87. One may note a correlation shown by dashed line 88 of peaks of signals 85 and 87 as a puff smoke. These peaks appear to be aligned with a cylinder pressure peak of signal 86. Also, an impact of PM particle 80 loading on the optical sensor 71 causing a change in magnitude of signal 87 as shown by arrow 89.

Figure 10:
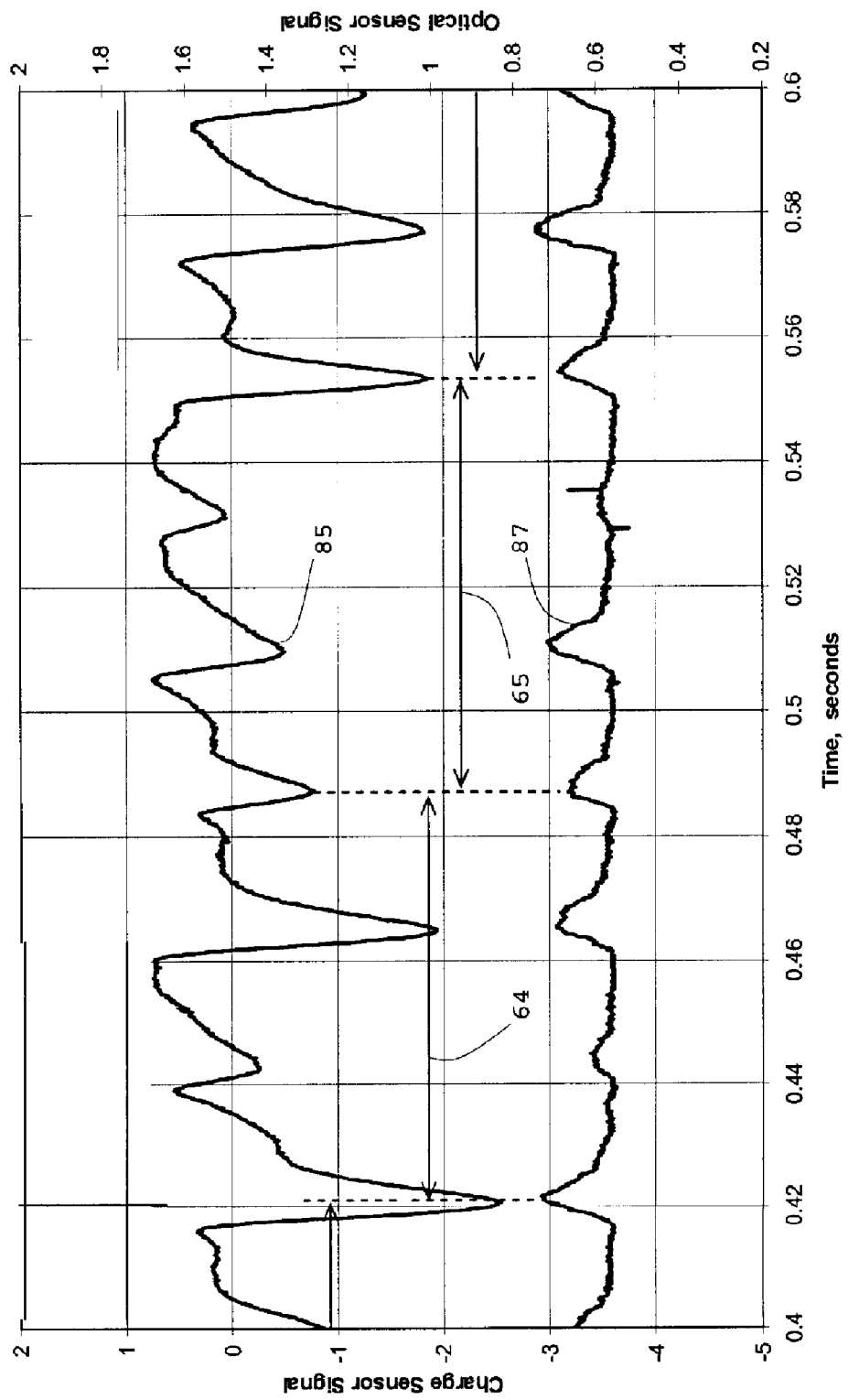
FIG. 10 shows an expanded view of the charge sensor signals and optical sensor signals.

FIG. 10a shows a comparison between the charge sensor signal 85 and optical sensor signal 87 at the same location. FIG. 10 shows small period of time (i.e., 0.4 to 0.6 seconds relative to 0 to 3.5 seconds) of FIG. 9 for signals 85 and 87. Dimensions 64 and 65 each reveal a length of a cycle. The length of a cycle is shown by dimension 64 or 65. It may be noted that there is very little difference between the times that the charge sensor 12 signal 85 and optical sensor 71 signal 87 peaks occur as shown by dashed lines 91. FIG. 10b shows a comparison of charge signals 85 and optical signals 87 resulting in a correlation coefficient of 0.69 for a straight line fit.

Figure 11:
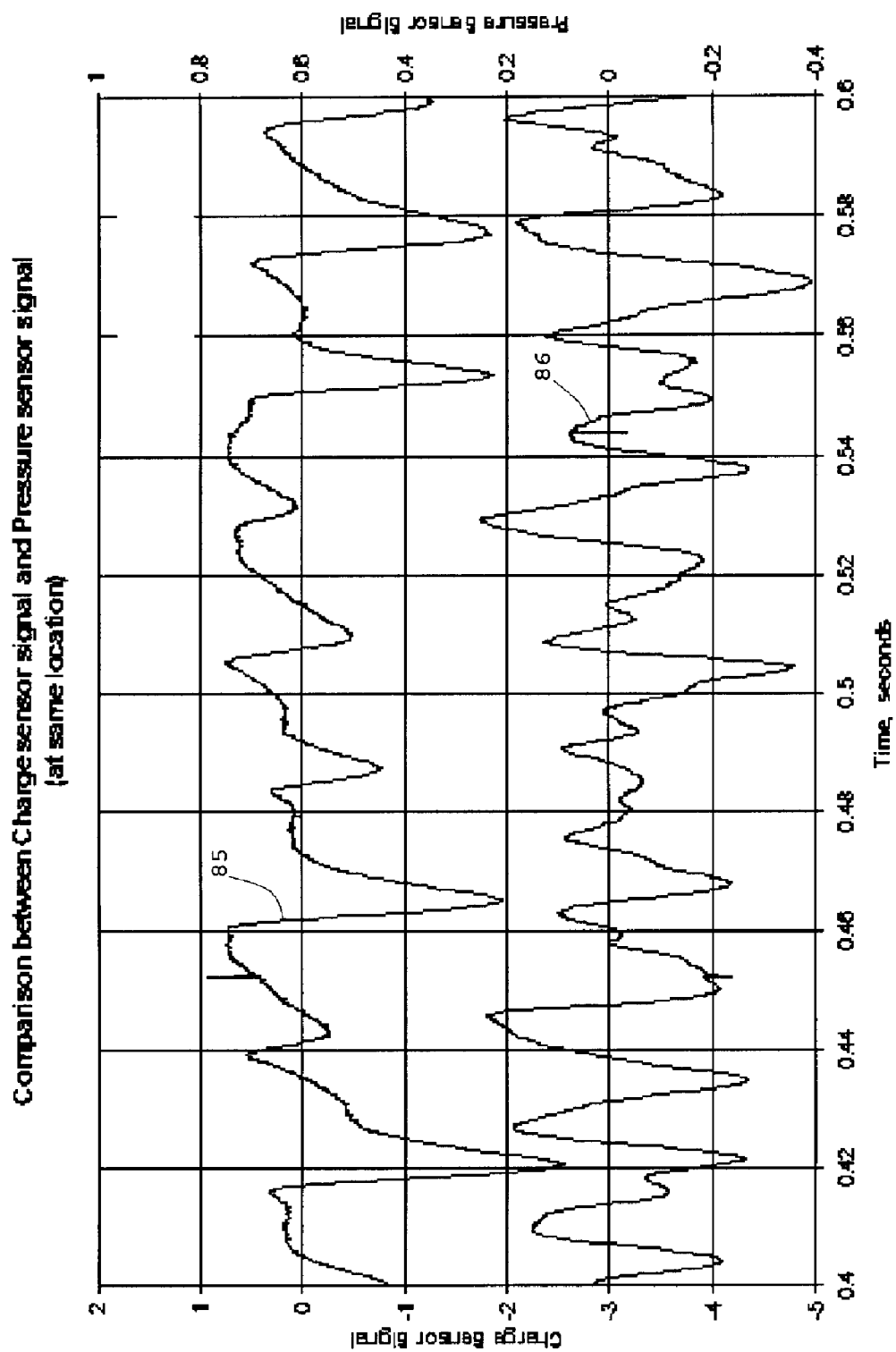
FIG. 11 shows an expanded view of charge sensor signals and cylinder pressure signals.

FIG. 11a is a graph comparing the charge sensor signal 85 with the cylinder pressure signal 86 at the same location. FIG. 11b is a graph where a comparison of the charge signals 85 and pressure signals 86 is plotted to determine a correlation between the signals. The correlation coefficient of the signals 85 and 86 is about 0.0003 for a straight line fit.

The particle size distribution from engines follows a log-normal, multi-modal size distribution with the concentration in any size range being proportional to the area under the corresponding curve in that range. The nuclei mode particles range in diameter from 0.005 to 0.05 micron (5-50 nm). They consist of metallic compounds, elemental carbon and semi-volatile organic and sulfur compounds that form particles during exhaust dilution and cooling. The nuclei mode typically contains 1 to 20 percent of the particle mass and more than 90 percent of the particle number. The accumulation mode particles range in diameter from 0.05 to 0.5 micron (50 to 500 nm). Most of the mass, composed primarily of carbonaceous agglomerates and adsorbed materials, is found here. The course mode consists of particles larger than one micron in diameter and contains 5 to 20 percent of the PM mass. These relatively large particles are formed by re-entrainment of particulate matter, which has been deposited on cylinder and exhaust system surfaces.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A sensor system comprising:
   a first particulate matter (PM) sensor situated in an exhaust conveyance device connected to an engine;
   a second PM sensor situated in the exhaust conveyance device downstream from a diesel particulate filter (DPF);
   a third PM sensor situated in the exhaust conveyance device downstream from the first PM sensor and upstream from the DPF filter; and
   a processor connected to the first PM sensor, the second PM sensor, the third PM sensor and the DPF filter.

2. The system of claim 1, wherein the processor outputs signals having information comprising:
   exhaust flow velocity;
   amount of loading of the DPF filter; and
   at least one of failure indication of the DPF filter; and
   time to clean the DPF filter.

3. The system of claim 1, wherein the processor outputs signals having information comprising optimal exhaust gas recovery (EGR) operation.

* * * * *